United States Patent
Bastos et al.

(10) Patent No.: US 7,385,607 B2
(45) Date of Patent: Jun. 10, 2008

(54) SCALABLE SHADER ARCHITECTURE

(75) Inventors: Rui M. Bastos, Porto Alegre (BR); Karim M. Abdalla, Menlo Park, CA (US); Christian Rouet, San Rafael, CA (US); Michael J. M. Toksvig, Palo Alto, CA (US); Johnny S. Rhoades, Durham, NC (US); Roger L. Allen, San Jose, CA (US); John Douglas Tynefield, Jr., Los Altos, CA (US); Emmett M. Kilgariff, San Jose, CA (US); Gary M. Tarolli, Concord, MA (US); Brian Cabral, San Jose, CA (US); Craig Michael Wittenbrink, Palo Alto, CA (US); Sean J. Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 620 days.

(21) Appl. No.: 10/938,042

(22) Filed: Sep. 10, 2004

(65) Prior Publication Data

US 2005/0225554 A1    Oct. 13, 2005

Related U.S. Application Data

(60) Provisional application No. 60/561,617, filed on Apr. 12, 2004.

(51) Int. Cl.
  *G06F 15/16*    (2006.01)
  *G06F 15/80*    (2006.01)
  *G06T 1/20*    (2006.01)
(52) U.S. Cl. .................. 345/502; 345/505; 345/506
(58) Field of Classification Search ............. 345/502, 345/505–506, 522, 543–544, 582, 619; 712/28
See application file for complete search history.

(56) References Cited

U.S. PATENT DOCUMENTS 4,901,064 A * 2/1990 Deering ............... 345/426

(Continued)

FOREIGN PATENT DOCUMENTS

WO    WO 01/71519 A2    9/2001

OTHER PUBLICATIONS

K. Proudfoot, W. Mark, S. Tzvetkov, P. Hanrahan. "A Real-Time Procedural Shading System for Programmable Graphics Hardware." ACM SIGGRAPH 2001, pp. 159-170.*

(Continued)

*Primary Examiner*—Kee M. Tung
*Assistant Examiner*—Joni Hsu
(74) *Attorney, Agent, or Firm*—Patterson & Sheridan, LLP

(57) ABSTRACT

A scalable shader architecture is disclosed. In accord with that architecture, a shader includes multiple shader pipelines, each of which can perform processing operations on rasterized pixel data. Shader pipelines can be functionally removed as required, thus preventing a defective shader pipeline from causing a chip rejection. The shader includes a shader distributor that processes rasterized pixel data and then selectively distributes the processed rasterized pixel data to the various shader pipelines, beneficially in a manner that balances workloads. A shader collector formats the outputs of the various shader pipelines into proper order to form shaded pixel data. A shader instruction processor (scheduler) programs the individual shader pipelines to perform their intended tasks. Each shader pipeline has a shader gatekeeper that interacts with the shader distributor and with the shader instruction processor such that pixel data that passes through the shader pipelines is controlled and processed as required.

44 Claims, 4 Drawing Sheets

U.S. PATENT DOCUMENTS

| | | | |
|---|---|---|---|
| 5,764,228 A * | 6/1998 | Baldwin | 715/797 |
| 5,821,950 A * | 10/1998 | Rentschler et al. | 345/505 |
| 6,351,681 B1 | 2/2002 | Chih et al. | |
| 6,791,559 B2 * | 9/2004 | Baldwin | 345/557 |
| 6,925,520 B2 * | 8/2005 | Ma et al. | 710/317 |
| 6,940,512 B2 * | 9/2005 | Yamaguchi et al. | 345/505 |
| 2003/0164830 A1 * | 9/2003 | Kent | 345/505 |
| 2004/0008200 A1 * | 1/2004 | Naegle et al. | 345/505 |
| 2004/0012596 A1 * | 1/2004 | Allen et al. | 345/501 |
| 2006/0238535 A1 * | 10/2006 | Goel et al. | 345/423 |

OTHER PUBLICATIONS

Matt Buckelew, "RealiZm Graphics," *IEEE Comp. Soc. Press*, Feb. 1997 Proceedings of IEEE CompCon '97, San Jose: pp. 192-197.

* cited by examiner

SCALABLE SHADER ARCHITECTURE

CROSS-REFERENCE TO RELATED APPLICATIONS

This application claims benefit of U.S. provisional patent application Ser. No. 60/561,617, entitled "GRAPHICS SHADER ARCHITECTURE" which was filed on Apr. 12, 2004, and which is herein incorporated by reference.

FIELD OF THE INVENTION

The present invention relates to computer systems, and more particularly to computer shading.

BACKGROUND OF THE INVENTION

Graphics processing is an important feature of modern high-performance computing systems. In graphic processing, mathematical procedures are implemented to render, or draw, graphic primitives, e.g., a triangle or a rectangle, on a display to produce desired visual images. Real time graphics processing is based on the high-speed processing of graphic primitives to produce visually pleasing moving images.

Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive surface to create the appearance of a complex image without the high computational costs associated with rendering actual three dimensional details of an object.

Graphics processing is typically performed using application program interfaces (API's) that provide a standard software interface that can be run on multiple platforms, operating systems; and hardware. Examples of API's include the Open Graphics Library (OpenGL®) and D3D™. In general, such open application programs include a pre-determined, standardized set of commands that are executed by associated hardware. For example, in a computer system that supports the OpenGL® standard, the operating system and application software programs can make calls according to that standard without knowing any of the specifics regarding the system hardware. Application writers can use APIs to design the visual aspects of their applications without concern as to how their commands will be implemented.

APIs are particularly beneficial when they are supported by dedicated hardware. In fact, high-speed processing of graphical images is often performed using special graphics processing units (GPUs) that are fabricated on semiconductor substrates. Beneficially, a GPU can be designed and used to rapidly and accurately process commands with little impact on other system resources.

FIG. 1 illustrates a simplified block diagram of a graphics system 100 that includes a graphics processing unit 102. As shown, that graphics processing unit 102 has a host interface/front end 104. The host interface/front end 104 receives raw graphics data from a central processing unit 103 that is running an application program stored in memory 105. The host interface/front end 104 buffers input information and supplies that information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional frame-buffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. While shaders are described in relation to graphics processing, shaders are, in general, useful for many other functions. Shaders can be considered as a collection of processing capabilities that can handle large amounts of data at the same time, such as by parallel handling of data.

The shader 110 includes a texture engine 112 that modifies the rasterized pixel data to have the desired texture and optical features. The texture engine 112, which has access to the data stored in the frame buffer memory 120, can be implemented using a hardware pipeline that processes large amounts of data at very high speed. The shaded pixel data is then sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used for various processes such as being displayed on a display 122.

Programmable shaders enable flexibility in the achievable visual effects and can reduce the time between a graphics function being made available and that function becoming standardized as part of a graphics API. Programmable shaders can have a standard API mode in which standard graphics API commands are implemented and a non-standard mode in which new graphics features can be programmed.

While shaders have proven themselves to be useful, demands for shader performance have exceeded the capabilities of existing shaders. While improving existing shaders could address some of the demands, such improvements would be difficult to implement. Furthermore, future demands can be anticipated to exceed the capabilities achievable by improved existing shader architectures and implementations. Therefore, a new shader architecture would be beneficial. Even more beneficial would be a new, high-performance programmable shader architecture that enables software-programmed graphics features. Also beneficial would be a new, high-performance programmable shader architecture that can be scaled as required to meet shader performance demands and that can be expanded to enable advanced graphical functionalities.

Additionally, since GPUs are large, complex semiconductor devices that operate at high speed and that generate large amounts of heat, and since a shader represents a significant area of a GPU, shader defects produce a significant percentage of GPU chip rejections. A shader architecture having the capability of enabling and disabling functional portions of a shader while still providing for shader processing functions would be beneficial.

BRIEF SUMMARY OF THE INVENTION

The principles of the present invention provide for new, useful, and non-obvious scalable shader architectures. Such shader architectures can be scaled up or down as required to meet performance demands and to offer systems having reduced or enhanced performance.

Some embodiments of the principles of the present invention can take the form of high-performance programmable shaders that include multiple shader pipelines, each of which can be programmed to perform data processing operations on rasterized pixel data. Beneficially, the shader pipelines are identical, they can be programmed independently, individual shader pipelines can be disabled, and shader processing operations can be performed even if one or more shader pipelines is disabled.

In embodiments of the present invention, a shader distributor distributes rasterized pixel data to the various shader pipelines, beneficially in a balanced manner such that the workloads of the shader pipelines are similar. However, if beneficial, one or more shader pipelines can be functionally disabled, thus preventing a defect in a shader pipeline from causing a non-functional chip. A shader collector collects and organizes the outputs of the shader pipelines so that they are in the proper order, resulting shaded pixel data. A shader instruction processor programs the individual shader pipelines as required to perform its processing tasks. Some embodiments of the present invention include more than one shader instruction processors.

Each shader pipeline includes a gatekeeper that interacts with the shader distributor and the shader instruction processor such that pixel data that passes through the shader pipelines is controlled and processed as required.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
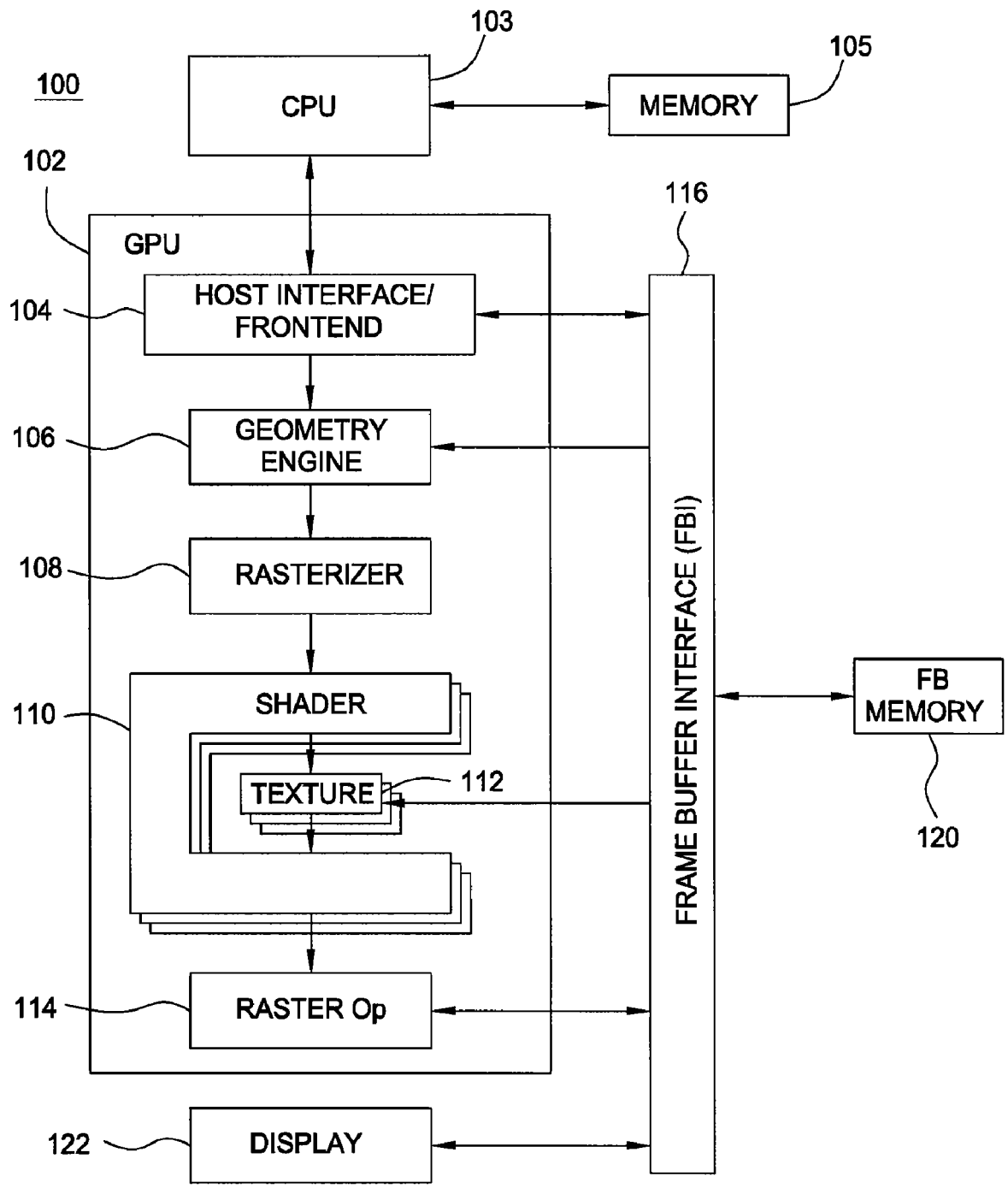
FIG. 1 schematically illustrates a prior art graphics system.

The principles of the present invention provide for new, scalable, and programmable shader architectures. A shader architecture that is in accord with those principles includes multiple shader pipelines that can be programmed to perform processing operations on rasterized pixel data to produce shaded pixel data. One or more shader pipelines can be functionally disabled while still maintaining the functionality of the shader. This enables reduced chip rejections, and allows for implementing lower or higher performance chips by simply adjusting the number of pipeline available in a given chip. Such a shader architecture includes a shader distributor that applies rasterized pixel data, albeit processed rasterized pixel data, to the various shader pipelines, beneficially in a manner that balances their workloads. A shader collector collects and organizes the shader pipeline outputs into proper order to produce shaded pixel data. A shader instruction processor (scheduler) programs the individual shader pipelines to perform their intended tasks. Some embodiments can make use of multiple shader instruction processors, such as having one shader instruction processor for each shader pipeline.

Each shader pipeline can be programmed to execute a distinct set of program commands that implement various processing operations (a program). Those commands can include branching instructions, texture processing, and mathematical operations using floating-point, fixed-point, and/or integer values. Each shader pipeline includes a shader gatekeeper that interacts with the shader distributor and with the shader instruction processor such that data that passes through the shader pipelines is processed as required.

To better understand the new shader architecture it may be helpful to understand its functions in more detail. Referring back to FIG. 1, the inputs to a shader are two-dimensional display co-ordinates of the vertices of the graphics primitives used in the graphics system. Furthermore, the texture station 112 has access to data in the frame buffer 120. Typically, but not always, those graphic primitives are triangles. For example, FIG. 2A illustrates the coordinates (0,0), (1,0), and (1,1) of the vertices that define a graphic primitive triangle 202. If rectangles are used, the additional coordinate (0,1) would be included in the graphics primitive. However, except for two-dimensional objects such as text, triangles are more common.

Figure 2A:
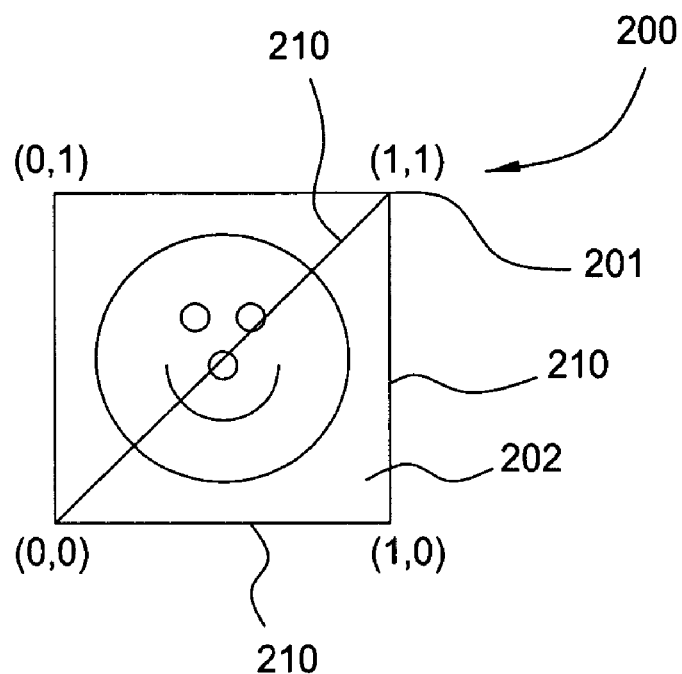
FIG. 2A schematically illustrates a triangle geometric primitive.
Figure 2B:
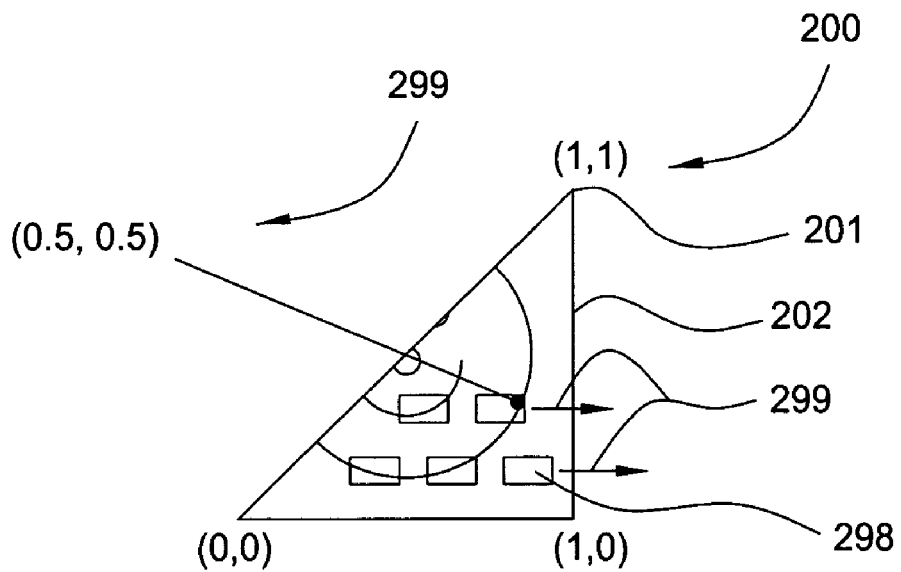
FIG. 2B illustrates a triangle geometric primitive having pixels aligned along each scan line.

Once the vertices 201 of the triangle 202 are known, the pixels within the graphical primitive are determined since they are the pixels located between the lines 210 that form the graphic primitive. Usually the pixels are organized along raster scan lines. For example, FIG. 2B illustrates a plurality of pixels 298 within the triangle 202 that are aligned by scan lines 299.

Figure 3:
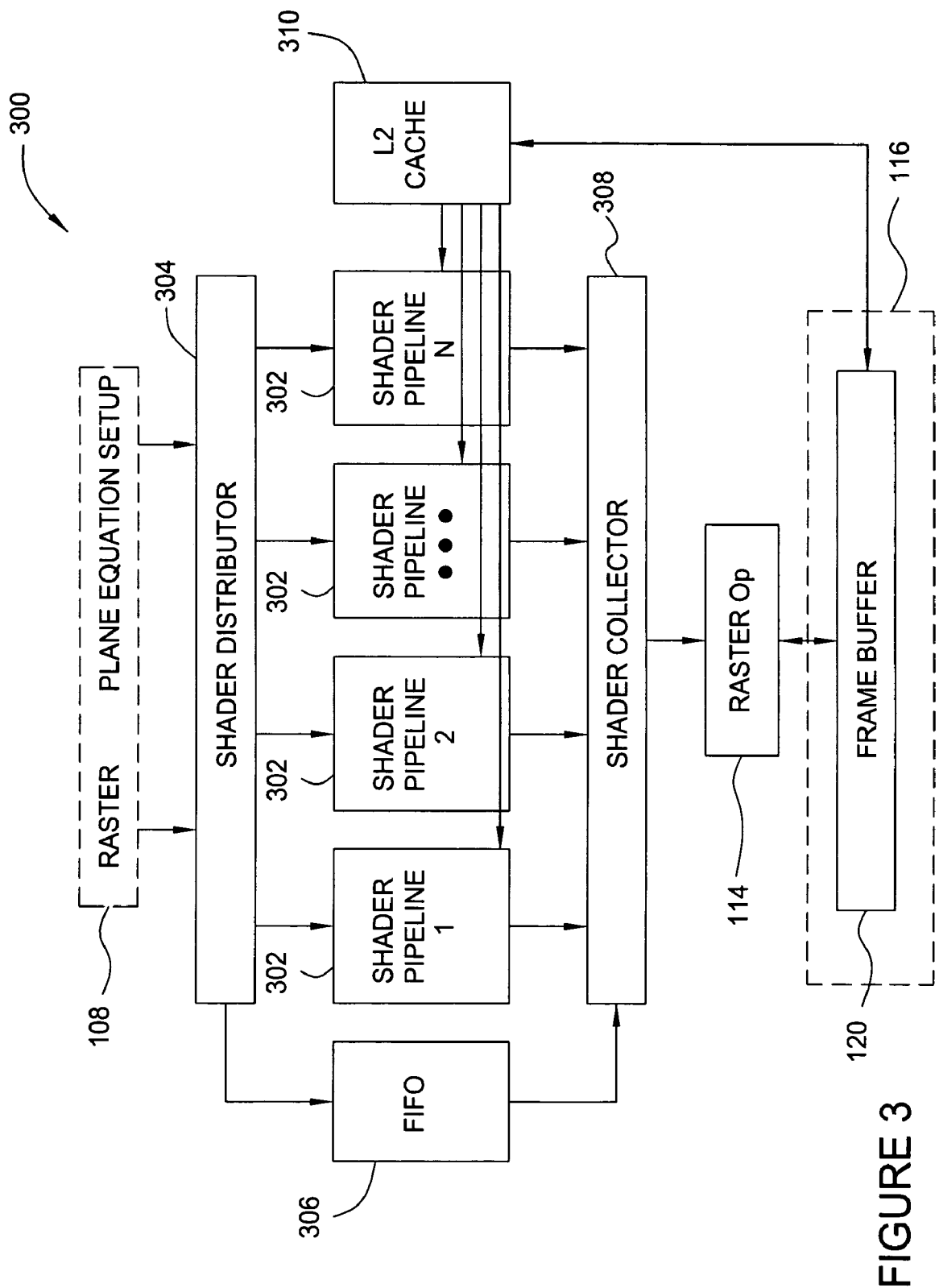
FIG. 3 is a high-level block diagram of a shader architecture having multiple shader pipelines and that is in accord with the principles of the present invention.

FIG. 3 is a high-level block diagram of a shader 300 having an architecture that is in accord with the principles of the present invention. The shader 300 represents a new, useful, and unobvious embodiment of the generic shader 110 of FIG. 1. The purpose of the shader 300 is to convert the rasterized pixel data (which has raw X, Y per fragment and plane equations for per-vertex attributes such as color, depth, texture, coordinates, etc). from the rasterizer 108 into appropriate color and depth values for each pixel to be sent to the frame buffer. To do so, the shader 300 executes large numbers of operations to resolve mathematical equations in response to graphics API functions and in response to application program commands to produce the desired color and depth values to form shaded pixel data. After additional processing by the Raster Operations Processor, the shaded pixel data is converted into frame pixel data that is stored by the frame buffer interface 116 in the frame memory 120 (reference FIG. 1).

A notable feature of the shader 300 is its multiple shader pipelines 302. Each shader pipeline 302 can be individually programmed via program information stored in the frame buffer memory 120 to perform mathematical and other processing operations on rasterized pixel data to produce shaded pixel data. While the shader 300 is shown as having four shader pipelines 302, there could, in general, be from 1 to N shader pipelines 302, where N is an integer. This scalability can be used to control shader processing power by simply adding/subtracting shader pipelines. Furthermore, such scalability enables shader pipeline 302 redundancies, which, in turn, enables the ability to functionally disable defective shader pipelines 302, while still maintaining the overall operation of the shader 300. Since the shader pipelines 302 are beneficially identical, it is a relatively simple task to fabricate additional shader pipelines 302 as required since the same masks and semiconductor fabrication processes can be used.

The shader 300 also includes a shader distributor 304. One function of the shader distributor 304 is to distribute information from the rasterizer 108 (rasterized pixel data) to the various shader pipelines 302 so that they may process the rasterized pixel data. Beneficially this distribution is performed in a manner that provides for a balanced workload between the shader pipelines 302. That is, each shader pipeline 302 performs similar amounts of processing and none is preferred over the others. Another function of the shader distributor 304 is to process the data from the rasterizer 108 such that the shader pipelines 302 only receive what they require.

A portion of control data, referred to as state data, coming from the rasterizer that is not used by the shader pipelines 302 is applied by the shader distributor 304 to a first in/ first out buffer memory 306. Besides state data, the first in/first out buffer memory 306 also receives X-Y coordinate and pixel coverage data, which also do not go through the shader pipelines 302.

Because the shader pipelines 302 independently process rasterized pixel data, the outputs of the shader pipelines 302 have to be organized in such a manner that the resulting processed pixel data is properly matched with the pixels in the frame buffer (by raster scan lines). The shader 300 therefore includes a shader collector 308 that receives the outputs of the shader pipelines 302 and the outputs of the first in/ first out buffer memory 306, and that organizes the results of the shader operations to produce shaded pixel data for the Raster Operations Processor 114 (ROP).

The output of the shader collector 308 is applied via the frame buffer interface 116 to the frame buffer memory 120, and thus to the display 122. Since the shader pipelines 302 can all request data from the frame buffer memory (through texture requests), the shader 300 also includes an L2 cache memory 310 to assist in that process.

Figure 4:
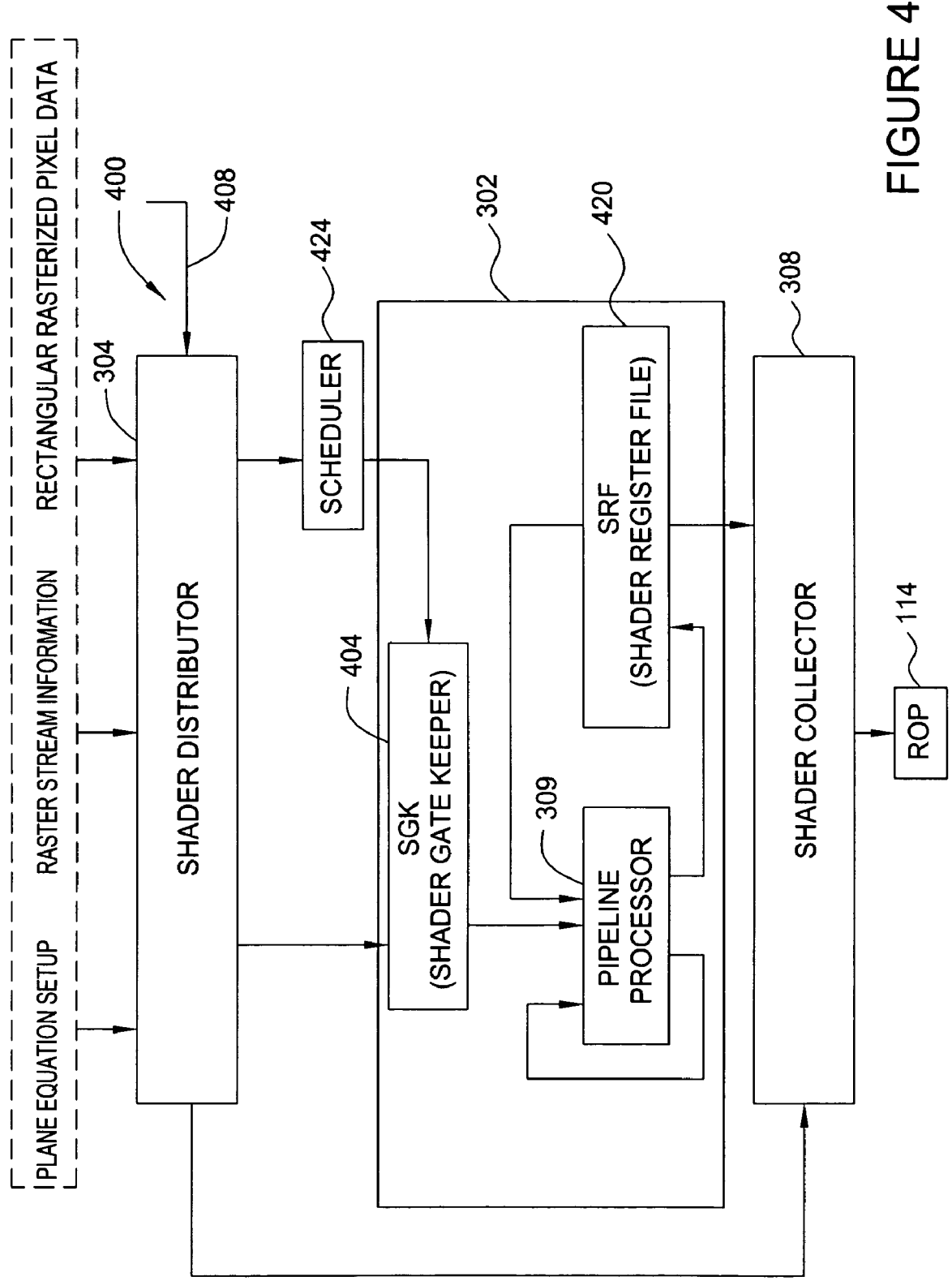
FIG. 4 is a block diagram that illustrates selected architectural features of the shader architecture shown in FIG. 3, but that shows only one of several shader pipelines.

The shader 300 has a shader architecture that is in accord with the principles of the present invention. That architecture enables multiple and individually programmable shader pipelines, a shader distributor that distributes data to the shader pipelines, a shader collector that collects the computation results of the shader pipelines and that organizes the shader pipeline results to form shaded pixel data for use by the ROP 114, which further processes the shaded pixel data to form frame buffer data. While the overall architectural scheme is clear, to assist understanding the benefits and applications of the present invention, a more detailed explanation of the shader 300 may be helpful. To that end, FIG. 4 illustrates a more detailed block diagram of portions 400 of the shader 300. It should be understood that while the portions 400 show only one shader pipeline 302 and one scheduler, multiple shader pipelines 302 and multiple schedulers are in full accord with the principles of the present invention.

Referring to FIG. 4, the shader distributor 304 receives information from the rasterizer 108, and then distributes raster stream information and rectangular raster stream information to shader gate keeper 404 (described in more detail subsequently) within the shader pipeline 302. Information from the rasterizer 108 is in two main formats, triangle plane equation information, shown as plane equation set-up, and triangle rasterized pixel data in the form of raster stream information. Additionally, since the shader 300 also handles 2-dimensional information which is input with reference to rectangular geometric primitives, the shader distributor 304 also receives rectangular rasterized pixel data.

Referring to FIG. 3, a main function of the shader distributor 304 is to distribute the triangle plane equation information and the raster stream information to the individual shader pipelines 302, beneficially in a manner that balances the shader pipeline workloads between the available shader pipelines 302. That is, no shader pipeline 302 is preferred in processing and each has the same functionality. This will typically result in equal work being performed by the various shader pipelines 302. As previously noted, information that is not needed by the shader pipeline 302, but which is required for other purposes, is forwarded by the shader distributor 304 to the first in/first out buffer memory 306 (see FIG. 3).

Actually distributing data to the shader pipelines 302 is performed in two phases: segmentation and distribution. This is at least partially because each shader pipeline 302 can perform operations only on a limited number of pixels at a time. That number is usually much less than the number of pixels that must be processed to complete graphical operations. Thus, the incoming data is broken into portions using "end-of-segment" tokens. The end-of-segment tokens and other resource limitations force the incoming data to be chopped into groups called "segments."

Segmentation is the process of chopping up the incoming raster stream information into segments. There are actually multiple reasons to segment. One being load-balancing between the multiple shader pipelines 302 and another being the workload size that can be done by a single shader pipeline 302. The later depends on the number of pixels that can be handled by pipeline processor 309 within the shader pipeline 302 (see FIG. 4). That number is limited by a condition referred to as deadlock, which is described subsequently. The number of pixels that can be handled by a single shader pipeline 302 is also limited by memory storage capacity of a shader register file (RAM) 420.

In addition to the maximum number of pixels that can be handled by pipeline processor 309 and the memory storage capacity of a shader register file (RAM) 420, other practicalities limit the size of a segment. Shader gatekeeper 404 has a limited amount of RAM. In practice, that RAM limits the number of triangles (attributes and pixels) that can be part of a segment. That number depends on the number of words each triangle takes up in the shader gatekeeper 404 RAM, which dynamically depends on factors such as the number of texture coordinates (and their respective dimensionality) being handled per triangle. The actual number of pixels that are processed depends on the organization of the shader pipelines and the available latency of the shader pipeline processor 309.

Another reason to segment is that a shader pipeline 302 may not re-circulate state bundles, that being data that controls the operation of the shader pipeline 302. Since a state bundle cannot be part of processed data, segment boundaries, and thus segments, are needed.

Related to segmentation is how data is organized. In one embodiment, the shader 300 operates on pixel "quads," that is, 2×2 pixel blocks having components that are processed together. Then, segments of quads are formed. However, using quads is not a requirement of the principles of the present invention. Some embodiments may not process specific groups of pixels at all, while some others may use other numbers of pixels in a group, for example, three pixel groups called triads. In general, a pixel grouping can be from 1 to M, where M is an integer.

Distribution is the process of choosing one of the shader pipelines 302 and then feeding that shader pipeline 302 a complete segment, then feeding the next segment to the next shader pipeline 302, and so on. In the shader 300 (see FIG. 3), the segment distribution sequence is a simple round robin assignment between the operable shader pipelines 302. For instance if there are 4 shader pipelines 302 but only three are operable, then the distribution sequence is between the three operable shader pipelines 302. The first segment would go to shader pipeline 0, then to the next segment to shader pipeline 1, then to the next to shader pipelines 2, and then back to shader pipeline 0 and so on.

As previously noted, the shader distributor 304 can be configured (either during operation or at the time of manufacture) to disable selected shader pipelines 302. This enables the functions of defective shader pipelines 302 to be performed by other shader pipelines 302 and enables a manufacturer to supply reduced or enhanced performance devices. Thus, a defective shader pipeline 302 does not necessarily result in rejection of the entire semiconductor chip. Any method of determining which shader pipelines are functional can be used. For example, chip testing at the time of manufacture, test programs, visual inspection of either the chip or its results can be used to identify functional shader pipelines 302.

Turning now to FIG. 3, the disabling of selected shader pipelines 302 is related to enabling shader pipelines. Since a single triangle can be very large, processing it can span multiple segments. But, since one shader pipeline 302 can only process one segment at a given time, a large triangle must be processed by multiple shader pipelines 302. To assist doing this, the shader distributor 304 broadcasts triangle information to all of the shader pipelines 302 that are not actually processing a segment. Each of the receiving shader pipelines 302 attempts to configure itself using the program information and prepares to receive incoming rasterized pixel data. Then, the shader pipeline 302 that is to process the segment receives the rasterized pixel data and begins processing it. Rasterized pixel data is distributed to one, and only one, shader pipeline 302.

To assist implementing distribution and to "turn off" unused shader pipelines 302, the shader 300 can use a pipe enable mask that informs the shader 300 which shader pipelines 302 are operable. Such mask signals can be applied to the shader distributor 304 via a bus 408. Operable shader pipelines 302 can have their mask bits set to one, non-operable shader pipelines 302 have their masks set to zero. The mask signals could be applied by jumper switches, software commands, hardwires, or other mechanisms.

Configuring all shader pipelines that are not processing a segment has the clear advantage that if the triangle spills over to another segment, that segment can be sent to an already configured shader pipeline 302. Then, by validating that triangle on one shader pipeline 302, the raster data for the triangle in the segment can be processed. This process not only avoids having to send new programming data for large triangles that spill over to new segments, but it also enables additional shader pipelines 302 to be validated without a complex mechanism to retransmit segments from the shader distributor 304. Available shader pipelines 302 simply accept any incoming segment and await validation. If the triangle information is not used by a shader pipeline that triangle information is overwritten by the shader gatekeeper.

Some notes about the shader distributor 304 output streams may be helpful. A shader distributor 304 only forwards triangle information that have at least one non-zero pixel. This mechanism is called Null Triangle Discard. This improves processing operations by ensuring that processing power is not squandered by starving a shader pipeline 302 of data.

In some embodiments a shader distributor 304 has functionality related to the programming of the shader pipelines 302. In those embodiments, programming instructions are sent by the shader distributor 304 to the shader pipelines 302. In some of those embodiments, only the initial N (say 8) programming instructions are sent. In such embodiments, or in embodiments in which the shader distributor does not send program information to the shader pipelines 302, a scheduler 424 (shown in FIG. 4) applies program instructions to the shader pipeline 302. The scheduler 424 then must co-ordinate the application of the rasterized pixel data from the shader distributor 304 to the shader pipeline 302.

Referring to FIGS. 1 and 3, a copy of the program instructions are beneficially stored in the frame buffer memory 120. Programming of the shader pipelines 302 is performed using fragment programs: small instruction sets that implement subsets of the complete graphical program. Fragment programs are used because a shader pipeline 302 has limited resources, which means that a complete graphic's program will usually be too large to be directly applied to a shader pipeline 302. Thus, fragment programs are formed and applied to a shader pipeline 302. For example, N, say 8, program instructions can be obtained, converted into a corresponding fragment program, and used to program a shader pipeline 302. After a segment is processed by the N (8) instructions, another fragment program that implements the next N (8) instructions is formed and applied to the shader pipeline 302.

As previously noted, in some embodiments of the present invention the initial N instructions are applied through the shader distributor 304. This can be performed in a number of different ways. For example, the initial N instructions can be sent to the scheduler 424 (either directly or through another mechanism). The scheduler 424 can then form the initial fragment program from the initial N instructions. That initial fragment program can then be sent directly to the shader pipeline 302. Subsequent fragment programs, and/or the initial fragment program, can then be formed by the shader processor 424 accessing the frame buffer memory 120 itself, either directly or via some other mechanism. It should be noted that while a given shader pipeline 302 can only be programmed with one fragment program, different shader pipelines 302 can be programmed with different fragment programs. Additionally, pipeline looping and branching is performed as required to implement the desired fragment program and to run fragment programs serially.

In the illustrated embodiment, branching instructions are appended at the end of the latest shading pass. When a branch operation occurs an empty pass through a shader pipeline occurs while new program instructions are provided. The next pass restarts at the shader computation bottom. This enables a reading of the content of the shader register file 420. While a branch operation requires two passes, branching operations can be beneficial. For example, large branching blocks often don't required shader recompilation.

Turning now to FIG. 4, while programmable shader pipelines are known, the shader 300 includes a novel shader gatekeeper 404. The shader gatekeeper 404 receives segment, triangle equation information, and program data from the shader distributor 304. The triangle stream information is sent to all of the shader pipelines 302. The shader distributor 304 validates a triangle being processed.

After shaded pixel data has been processed, the shader collector 308 collects the shaded pixel data from the multiple shader pipelines 302 and combines that data with X, Y, and coverage data from the first in/ first out buffer memory 306 to form an organized shader pixel data packet. The resulting data is sent to a Raster Operations Processor 114 that performs additional processing; reference the graphics processing units 102. After Raster Operations Processor processing the final frame pixel data is output to the frame buffer interface 116.

While various embodiments have been described above, it should be understood that they have been presented by way of example only, and not limitation. The foregoing references to specific number, for example the use of quads are for purposes of explanation and illustration only. Thus, the breadth and scope of a preferred embodiment should not be limited by any of the above described exemplary embodiments, but should be defined only in accordance with the following claims and their equivalents.

What is claim is:

1. A shader, comprising:
    a plurality of shader pipelines, each one of the shader pipelines for processing segments of rasterized pixel data;
    a plurality of shader schedulers coupled to the plurality of shader pipelines and configured to select portions of a graphics program to produce fragment programs that each include a limited number of program instructions that control the processing of the segments of rasterized pixel data, wherein the limited number is based on resources of the plurality of shader pipelines;
    a shader distributor for segmenting a raster stream of pixel data into the segments of rasterized pixel data of a limited size and selectively distributing the segments of rasterized pixel data to said plurality of shader pipelines, wherein the shader distributor broadcasts triangle information to all of the shader pipelines in the plurality of shader pipelines to configure a set of shader pipelines that are not processing a segment of rasterized pixel data and validates the triangle information to initiate processing of segments of rasterized pixel data using the triangle information; and
    a shader collector for collecting the result of the shader pipelines to form shaded pixel data that is suitable for display.

2. A shader according to claim 1, wherein said fragment programs include a branching command that causes at least one shader pipeline to perform a branching operation.

3. A shader according to claim 1, further including a rasterizer for sending the raster stream of pixel data to said shader distributor.

4. A shader according to claim 3, further including a shader register file of a memory storage capacity within each one of the shader pipelines, wherein the limited size of the segments of rasterized pixel data produced by said shader distributor are based on the amount of rasterized pixel data that can be stored within the memory storage capacity of the shader register file.

5. A shader according to claim 1, wherein at least one of the shader pipelines processes the segments of rasterized pixel data to add texture information.

6. A shader according to claim 1, wherein at least one of the shader pipelines performs mathematical operations on said segments of rasterized pixel data.

7. A shader according to claim 1, wherein said shader distributor functionally disables at least one of the shader pipelines that is defective based upon received configuration information.

8. A shader according to claim 7, wherein said shader distributor functionally disables said at least one of the shader pipelines by not distributing segments of rasterized pixel data to said at least one shader pipeline.

9. A shader according to claim 1, wherein different shader pipelines are programmed with different fragment programs.

10. A shader according to claim 1, wherein the limited number of program instructions in the fragment programs is eight.

11. A shader according to claim 1, further including a first in/first out buffer memory coupled between the shader distributor and the shader collector and configured to store x-y coordinates and pixel coverage data that is not processed by the plurality of shader pipelines.

12. A computer system, comprising:
    a central processing unit for running an application program that causes the central processing unit to produce data; and
    a processing unit for converting said data into frame buffer pixel data that is suitable for display, said processing unit including a shader having:
        a plurality of shader pipelines, each shader pipeline for processing segments of rasterized pixel data to produce shaded pixel data;
        a plurality of shader schedulers coupled to the plurality of shader pipelines and configured to select portions of a graphics program to produce fragment programs that each include a limited number of program instructions that control the processing of the segments of rasterized pixel data, wherein the limited number is based on resources of the plurality of shader pipelines;
        a shader distributor for segmenting a raster stream of pixel data into the segments of rasterized pixel data of a limited size and selectively distributing the segments of rasterized pixel data to said plurality of shader pipelines, wherein the shader distributor broadcasts triangle information to all of the shader pipelines in the plurality of shader pipelines to configure a set of shader pipelines that are not processing a segment of rasterized pixel data and validates the triangle information to initiate processing of segments of rasterized pixel data using the triangle information; and
        a shader collector for collecting the shaded pixel data from said plurality of shader pipelines to produce the frame buffer pixel data.

13. A computer system according to claim 12, wherein the computer system includes a frame buffer memory for storing the frame buffer pixel data.

14. A computer system according to claim 12, further including a display for displaying the frame buffer pixel data.

15. A computer system according to claim 12, wherein said fragment programs include a branching command that causes at least one shader pipeline to perform a branching operation.

16. A computer system according to claim 12, wherein said processing unit further includes a rasterizer for sending the raster stream of pixel data to said shader distributor.

17. A computer system according to claim 16, further including a shader register file of a memory storage capacity within each one of the shader pipelines, wherein the limited size of the segments of rasterized pixel data produced by said shader distributor are based on the amount of rasterized pixel data that can be stored within the memory storage capacity of the shader register file.

18. A computer system according to claim 12, wherein at least one of the shader pipelines selectively processes the segments of rasterized pixel data to add texture information.

19. A computer system according to claim 12, wherein at least one shader pipeline selectively performs mathematical operations on the segments of rasterized pixel data.

20. A computer system according to claim 12, wherein said shader distributor functionally disables at least one of the shader pipelines that is defective based upon received configuration information.

21. A computer system according to claim 20, wherein said shader distributor functionally disables said at least one of the shader pipelines by not distributing the segments of rasterized pixel data to said at least one shader pipeline.

22. A computer system according to claim 12, wherein different shader pipelines are programmed with different fragment programs.

23. A computer system according to claim 12, wherein the limited number of program instructions in the fragment programs is eight.

24. A computer system according to claim 12, further including a first in/first out buffer memory coupled between the shader distributor and the shader collector and configured to store x-y coordinates and pixel coverage data that is not processed by the plurality of shader pipelines.

25. A graphics processing integrated circuit, comprising:
a front end for receiving raw graphic data;
a geometry engine for organizing said raw graphics data into geometric primitives;
a rasterizer for converting said geometric primitives into rasterized pixel data; and
a shader for processing said rasterized pixel data, said shader including:
a plurality of shader pipelines, each shader pipeline for processing segments of rasterized pixel data to produce shaded pixel data;
a plurality of shader schedulers coupled to the plurality of shader pipelines and configured to select portions of a graphics program to produce fragment programs that each include a limited number of program instructions that control the processing of the segments of rasterized pixel data, wherein the limited number is based on resources of the plurality of shader pipelines;
a shader distributor for receiving the rasterized pixel data, segmenting the rasterized pixel data into the segments of rasterized pixel data of a limited size, and for selectively distributing said segments of rasterized pixel data to said plurality of shader pipelines, wherein the shader distributor broadcasts triangle information to all of the shader pipelines in the plurality of shader pipelines to configure a set of shader pipelines that are not processing a segment of rasterized pixel data and validates the triangle information to initiate processing of segments of rasterized pixel data using the triangle information; and
a shader collector for collecting shaded pixel data from outputs of said plurality of shader pipeline, wherein the shaded pixel data is suitable for display.

26. The graphics processing integrated circuit of claim 25, further including a shader register file of a memory storage capacity within each one of the shader pipelines, wherein the limited size of the segments of rasterized pixel data is are based on the amount of rasterized pixel data that can be stored within the memory storage capacity of the shader register file.

27. The graphics processing integrated circuit of claim 25, wherein said shader distributor functionally disables at least one shader pipeline that is defective.

28. The graphics processing integrated circuit of claim 27, wherein said shader distributor functionally disables said at least one shader pipeline by not distributing the segments of rasterized pixel data to said at least one shader pipeline.

29. The graphics processing integrated circuit of claim 25, wherein at least one shader pipeline selectively processes the segments of rasterized pixel data to add texture information.

30. The graphics processing integrated circuit of claim 25, wherein at least one of the shader pipelines performs mathematical operations on said segments of rasterized pixel data.

31. The graphics processing integrated circuit of claim 25, wherein at least one of the shader pipelines performs a branch operation.

32. The graphics processing integrated circuit of claim 31, wherein said at least one of the shader pipelines performs the branch operation by adding the branch operation at the end of a currently executing program fragment and reading a new program fragment that is specified by the branch operation while an empty pass is performed through said at least one of the shader pipelines.

33. The graphics processing integrated circuit of claim 25, further comprising a first in/first out buffer memory coupled between the shader distributor and the shader collector and configured to store x-y coordinates and pixel coverage data that is not processed by the plurality of shader pipelines.

34. A method of operating a shader, comprising the steps of:
receiving rasterized pixel data from a rasterizer, wherein the rasterized pixel data includes information related to geometric primitives and information related to pixels within the geometric primitives;
segmenting the received rasterized pixel data into segments of predetermined length;
adding an end-of-segment tag to each of the segments;
selectively distributing the segments to a plurality of shader pipelines; and
selecting portions of a graphics program to produce fragment programs that each include a limited number of program instructions that control the processing of the segments;
wherein the limited number is based on resources of the plurality of shader pipelines,
wherein each shader pipeline processes one of the segments to produce shaded pixel data that is suitable for display,
wherein a first shader pipeline receives a first one of the segments, a second shader pipeline receives a second one of the segments; and, if available, additional shader pipelines sequentially receive one of the segments, until N shader pipelines have received N of the segments;

wherein after all shader pipelines that are to receive segments have received segments, the next of the segments is applied to the first shader pipeline.

35. The method of operating a shader according to claim 34, wherein not all shader pipelines receive one of the segments.

36. The method of operating a shader according to claim 35, wherein a shader pipeline is functionally disabled.

37. The method of claim 34, further including forming shaded pixel data by collecting and organizing processing results from the shader pipelines.

38. A method of operating a shader, comprising the steps of:
   selecting portions of a graphics program to produce a first fragment program that includes a first set of program instructions and a second fragment program that includes a second set of program instructions, wherein the first fragment program and the second fragment program each have a limited number of program instructions that control the processing of portions of rasterized pixel data and the limited number is based on resources of a first shading pipeline and a second shading pipeline;
   programming the first shading pipeline with the first set of instructions to perform operations;
   receiving the rasterized pixel data;
   selectively distributing a first portion of the rasterized pixel data to the first shading pipeline;
   programming the second shading pipeline with the second set of instructions to perform operations;
   selectively distributing a second portion of the rasterized pixel data to the second shading pipeline; and
   collecting and organizing the output of at least the first shading pipeline to form shaded pixel data that is suitable for display.

39. The method of operating a shader according to claim 38, wherein the first and the second set of instructions are different.

40. The method of operating a shader according to claim 38, wherein the step of selectively distributing the rasterized pixel data includes the step of segmenting the rasterized pixel data into the first portion and the second portion to prevent deadlock.

41. A graphics processing unit, comprising:
   a front end for receiving raw graphics data;
   a geometry engine for organizing said raw graphics data into geometric primitives;
   a rasterizer for converting said geometric primitives into rasterized pixel data;
   a shader for processing said rasterized pixel data, said shader including a plurality of shader pipelines, each shader pipeline for processing segments of rasterized pixel data to produce shaded pixel data, a plurality of shader schedulers coupled to the plurality of shader pipelines and configured to select portions of a graphics program to produce fragment programs that each include a limited number of program instructions that control the processing of the segments of rasterized pixel data, wherein the limited number is based on resources of the plurality of shader pipelines, a shader distributor for distributing said segments of rasterized pixel data to the plurality of shader pipelines, broadcasting triangle information to all of the shader pipelines in the plurality of shader pipelines to configure a set of shader pipelines that are not processing a segment of rasterized pixel data, and validating the triangle information to initiate processing of segments of rasterized pixel data using the triangle information, said shader further including a shader collector for forming shaded pixel data from said plurality of shader pipeline outputs; and
   a raster operations processor for processing the processed pixel data into frame buffer data that is suitable for display.

42. A graphics processing unit according to claim 41, wherein different shader pipelines are programmed with different fragment programs.

43. A graphics processing unit according to claim 41, wherein the limited number of program instructions in the fragment programs is eight.

44. The graphics processing unit according to claim 41, wherein the plurality of shader pipelines are configured to perform a branch operation by adding the branch operation at the end of a currently executing program fragment and reading a new program fragment that is specified by the branch operation while an empty pass is performed through the plurality of shader pipelines.

* * * * *